United States Patent Office 3,572,364
Patented Mar. 23, 1971

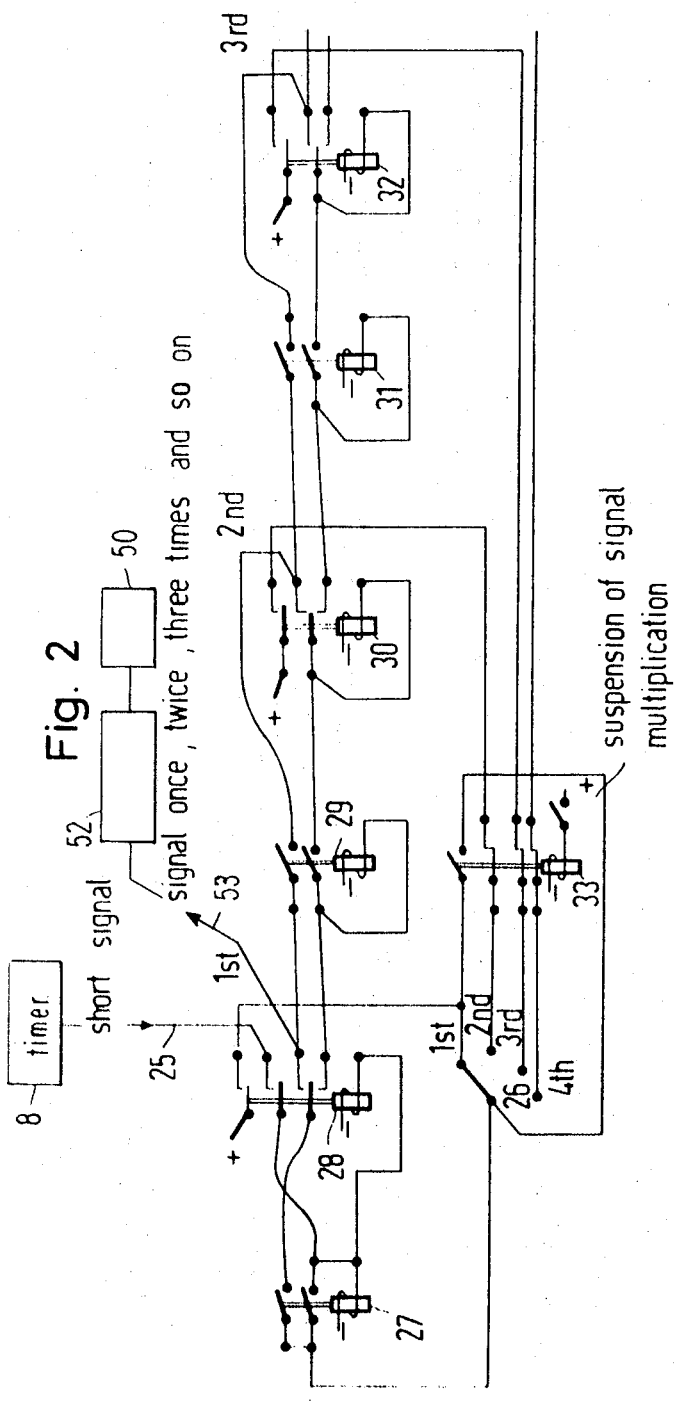

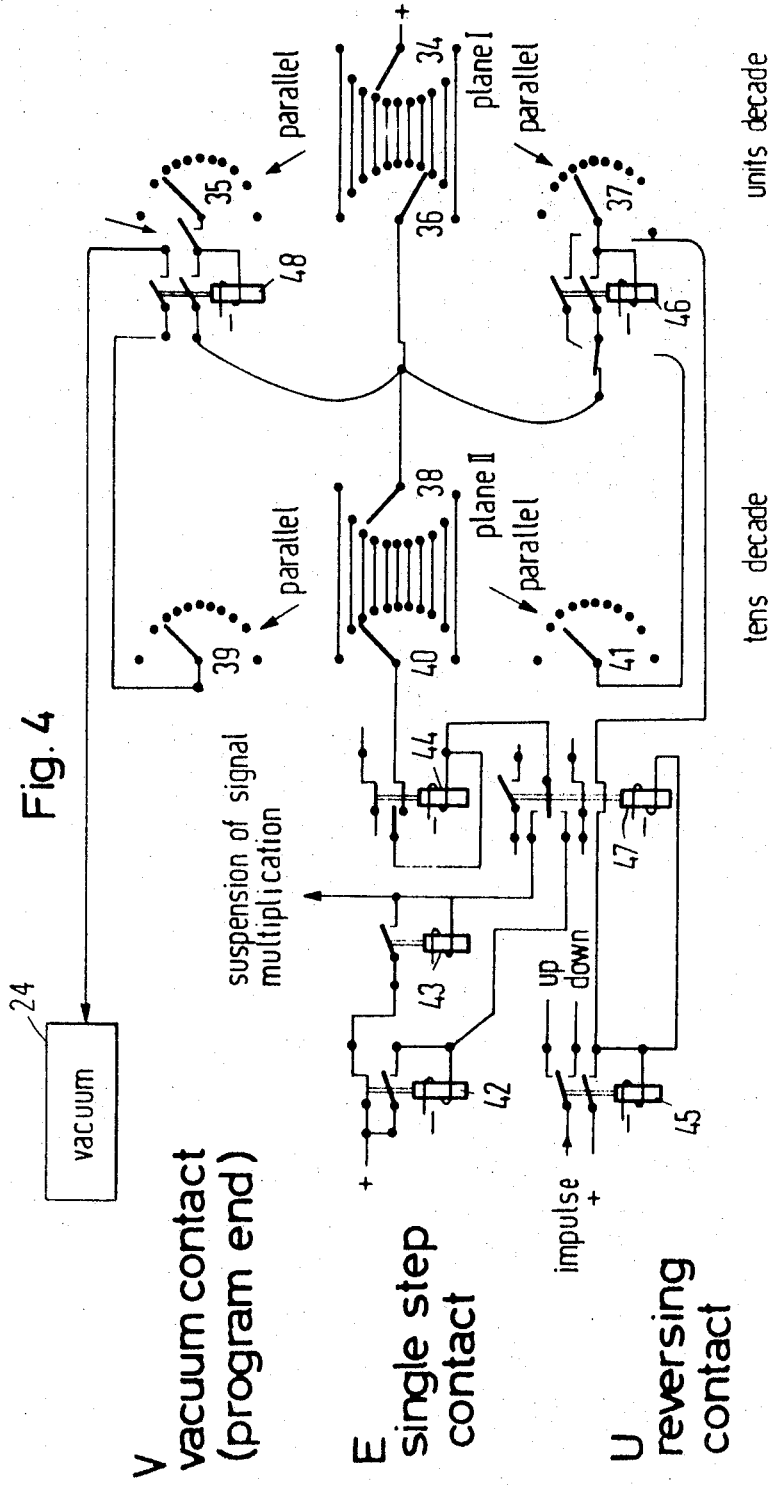

3,572,364
APPARATUS FOR THE MEASUREMENT, AUTOMATIC CONTROL AND PROGRAM CONTROL OF THE GAS PRESSURE IN A RECEIVER
Erich Robens and Gerd Sandstede, Frankfurt am Main, and Reinhard Theodor Gast, Berlin, Germany, assignors to Sartorius Werke G.m.b.H., Gottingen, Germany
Filed Apr. 11, 1968, Ser. No. 720,734
Claims priority, application Germany, Apr. 12, 1967, S 109,298; Apr. 13, 1967, S 109,306
Int. Cl. G05d *11/00;* G01l *7/00*
U.S. Cl. 137—110
12 Claims

ABSTRACT OF THE DISCLOSURE

An electronic vacuum microbalance system comprises a lift-producing member which is responsive to the gas pressure in a gas receiver and a pressure-setting stepping mechanism to control the capacity of said microbalance system. A pulse generator is connected to said stepping mechanism and operable to initiate stepping movements of said mechanism. A control system establishes and maintains in the receiver a pressure which corresponds to the setting of said stepping mechanism and includes gas valve means adapted to control the gas pressure in said receiver and an electric controller operatively connected to the microbalance system and to the gas valve means and adapted to control the gas valve means in response to the output of the microbalance system.

---

This invention relates to a device for a measurement, automatic control and program control of the gas pressure in a receiver.

It is known to convert a gage-sensed pressure into an electrical signal and to use the signal for a control of solenoid valves and electric motor-actuated valves so as to maintain a constant pressure. Arrangements have also been described in which the control point for this automatic pressure control is automatically changed in accordance with a program.

It is also known that the lifting force of a balance can be used for a pressure measurement in gases.

The previously known devices for an automatic and program control of the gas pressure in a receiver do not permit automatic control of the gas pressure in a receiver or control of said pressure according to a predetermined program, and a measurement of said gas pressure at the same time if the gas pressure varies within a very large range, from a vacuum to a pressure of about 150 kg./sq. cm.

It is an object of the invention to provide an apparatus which enables an automatic control of the gas pressure in a receiver and a concurrent measurement of said gas pressure even if the gas pressure varies within a very large range.

It is another object of the invention to provide an apparatus which enables a control of the gas pressure in a receiver in accordance with a predetermined program and a measurement of the gas pressure at the same time even if the gas pressure is varied within a very large range.

These objects are accomplished by the provision of an apparatus which comprises an electronic vacuum microscale provided with a lift-producing member, a pulse generator for controlling a pressure-setting stepping device, and an electric automatic controller, which preferably comprises a measuring system and functions to control final control elements, such as solenoid valves or motor-operated valves.

The apparatus according to the invention affords the advantage that inexpensive modifications of and additions to an electronic microscale enable a measurement, automatic and program control of pressure and the same apparatus may be selectively used for weighing. The apparatus according to the invention is unique in that it can perform these functions with very high sensitivity within a very large measuring range (from a vacuum to about 150 kg./sq. cm.). The apparatus may sweep the entire pressure range upwardly or downwardly in steps performed at selected times in accordance with a program.

Figure 1:
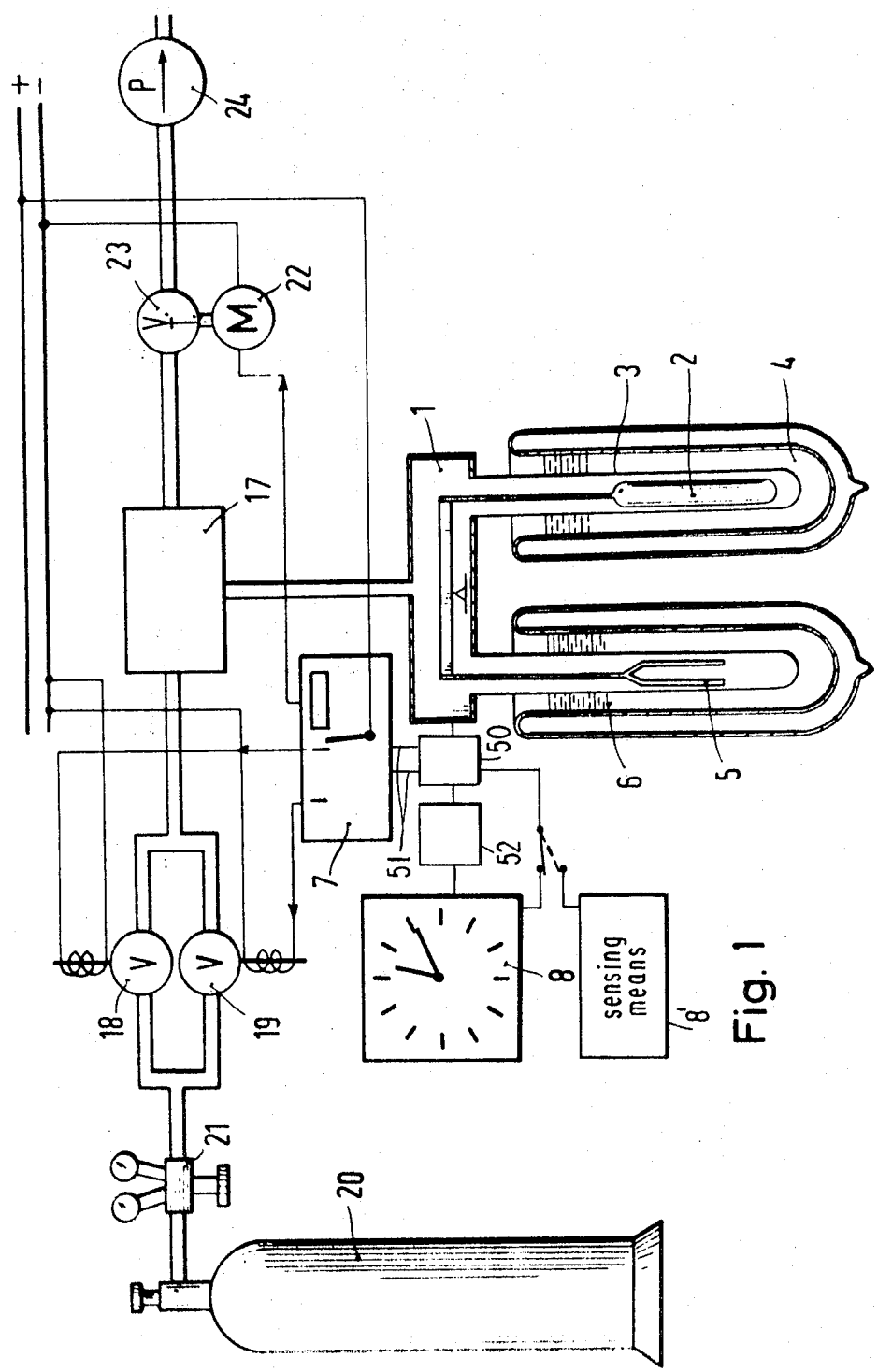
Figure 3A:
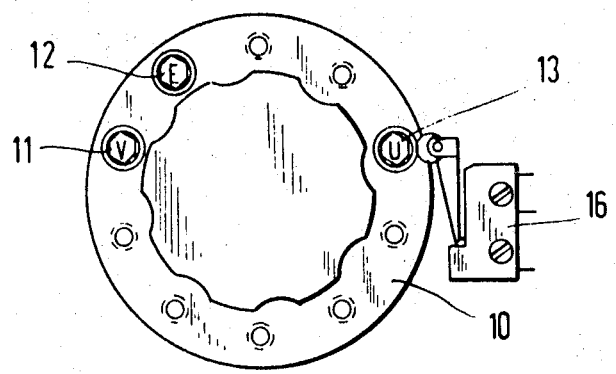
Figure 3B:
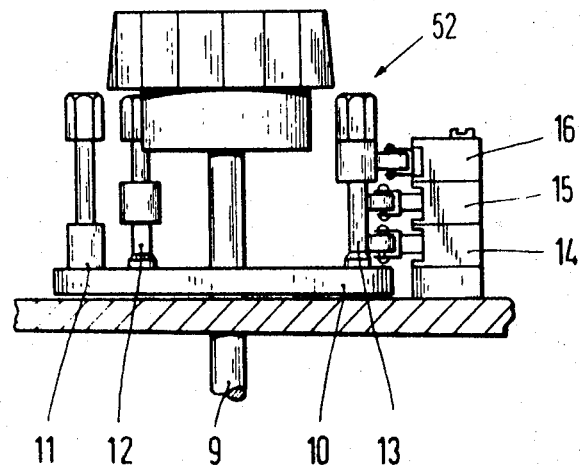

The design and mode of operation of the apparatus according to the invention will be described with reference to an embodiment which is shown by way of example on the accompanying diagrammatic drawings, in which FIG. 1 is a diagrammatic view showing a system for an automatic control of a gas pressure, FIG. 2 is a circuit diagram of a relay circuit, FIGS. 3*a–b* show a program-selecting device, and FIG. 4 is a circuit diagram showing another relay circuit.

The system shown in FIG. 1 comprises a lift-type pressure gage as a measuring means. The electronic microbalance 1 comprises a hollow extension 3 which contains a lift-producing member in the form of a glass bulb 2. A counterweight 5 is similarly arranged. Thermostats 4 and 6 are set to the same temperature and maintain a constant temperature. An electric controller 7 and a timer 8 are connected to the electric circuitry of the electronic microbalance 1 and serve for an automatic or program control of solenoid valves 18 and 19 and of a needle valve 23, which is operated by a motor 22. Pressure gas is supplied to a receiver 17 from a bomb 20 at a desired supply pressure, which is coarsely set by a pressure-reducing valve 21. When the pressure in the receiver 17 is excessively high, a suitable amount of gas is withdrawn from the receiver by a vacuum pump 24.

The counterweight 5 of high density consists, e.g., of a glass tube having the same surface area as the lift-producing member and serves to compensate disturbing effects which may be due to an adsorption on the lift-producing member. For an automatic control of pressure, the measuring instrument connected to the electric circuitry 50 of the balance by leads 51 is replaced by a controller 7, which is provided with a measuring system and indicates as an apparent change of weight the lift, which is proportional to the gas pressure.

A standard feature of the electric circuitry of the electronic microbalance is an electric compensator for selecting the measuring range and which can be stepped in unit steps and tens steps. The stepping mechanism 52 may consists, e.g., of a solenoid having an armature or of an electric motor, which in response to the pulse performs one revolution and by a maltese cross advances the stepping mechanism by one step. The stepping mechanism is provided with a cam for deenergizing the motor after one revolution.

For an automatic control of pressure, the following additions are made to this system: The desired pressure is electrically set by an adjustment of the stepping mechanism to a desired value. If the actual pressure is not at the desired value, the measuring controller 7 will indicate a deviation from its central zero position in the middle of the scale and will operate a valve, through which gas is supplied or withdrawn until the desired pressure has been reached.

A program control is carried out as follows: A pulse is transmitted, e.g., from a timer 8 and causes the stepping mechanism to perform one step so that another desired pressure is set. A pressure range can thus be swept in uniform steps at times which can be selected by setting the timer. Alternatively, the pulse may be transmitted by a sensing means 8' which initiates a program step when it senses an equilibrium of a measured variable, specifically of a weight.

The sensing means 8' and the timer 8 are alternatively connectable with the circuitry 50 of the microbalance.

For some purposes, the normally very small pressure-setting steps must be increased. To this end, the cam provided on the stepping mechanism to deenergize the motor after each revolution is replaced by another cam, which causes a deenergization only after two, three or more revolutions. The cam may be electrically selected if each cam actuates a different switch. Alternatively, the timer 8 may transmit a plurality of pulses in sequence. For instance, a pulse multiplication by a selected factor can be effected with the relay circuit shown in FIG. 2.

If the pulse consisting of a short electric signal is transmitted by the lead 25 to the circuit shown in FIG. 2 and the selector switch 26 is in its first position shown in the drawing, that pulse will cause via a relay 27 an operation of the slow-operating relay 28, which transmits to the stepping mechanism in the electric circuitry of the electronic microbalance a pulse over lead 53 to change the pressure setting by one step. In the second position of the selector switch, the slow-operating relays 29 and 30 are also operated in succession and the first pulse transmitted by relays 27 and 28 is succeeded by a second one at a time which depends on the delays for which relays 29 and 30 are set. In the third position of the selector switch, the relays 31 and 32 are subsequently operated too so that three pulses are transmitted in succession, etc. The relay 33 serves to eliminate the pulse multiplication by a switch, which is operated in a certain position of the stepping mechanism. When this position corresponding to a certain desired value for the gas pressure in the receiver has been reached, the subsequent pressure settings will be closer together. If the pressure-changing program is subsequently reversed in that the stepping mechanism is stepped down, said switch will be opened at said position of the stepping mechanism so that pulse multiplication is effected again and pulses in a number which is selected at the selector switch 26 are regularly transmitted, a corresponding number of pressure-setting steps are regularly skipped and the actual steps are increased in size.

To enable a change of the size of the pressure-setting steps during the performance of the program and a reversal of the direction of the program, the shafts 9 of the stepping mechanism are provided with discs 10, into which pins having cams 11–13 which are parallel to the shaft can be inserted, as is shown, e.g., in FIG. 3*b*. The cams 11–13 of these pins operate switches 14–16 so as to initiate the desired changes of the program.

Said changes can also be effected if the shafts of the stepping mechnaism are provided with contact-carrying discs rather than with pin-carrying discs. Where a relay circuit as shown in FIG. 4 is provided, three selector switches associated with each of the units and tens shafts of the stepping mechanism enable a selection of the pressure values at which the size of the pressure-setting steps is changed, the direction of the program is reversed, and the program is to be terminated, respectively.

In FIG. 4, a contact-carrying disc 34 is secured to the units shaft 9 of the stepping mechanism in the electric circuitry of the electronic microbalance and associated with three selector switches 35, 36, and 37. These switches are connected in parallel in that each contact of selector switch 35 is conductively connected to the corresponding contacts of the selector switches 36 and 37. The same applies to the contact-carrying disc 38 secured to the tens shaft and the associated selector switches 39, 40, 41.

For selecting a pressure-changing program with the aid of the electric circuitry shown in FIGS. 2 and 4, the selector switch 26 (FIG. 2) is used to select the number of pressure settings (two cascade-coupled shafts for ten steps per revolution enable 10×10=100 pressure settings) which are to be skipped regularly by the stepping mechanism during the performance of the pressure-changing program. The selector switches 40 and 36 are used to select the pressure setting after which this skipping is to be eliminated so that the subsequent pressure settings are closer together. This is effected with the aid of relays 42, 43 and of the slow-operating relay 44. The selector switches 41 and 37 are used to select a pressure at which the program is to be reversed with the aid of relays 45, 46 and a slow-operating relay 47. If the pressure has previously been automatically increased in steps to that value, the pressure is subsequently reduced in the same pressure steps. The selector switches 39 and 35 are used to select the pressure at which the pressure-changing program is subsequently terminated and an evacuation of the receiver is initiated. This is effected with the aid of relay 48.

If the apparatus is not provided with the pulse-multiplying circuit shown in FIG. 2 but with a switch which is operated by a cam that is provided on the shaft, the number of pressure settings which are to be skipped is selected by a positioning of the cam or by the selection of a switch to be actuated by the corresponding cam.

If the apparatus is not provided with the electric circuit shown in FIG. 4 but with two switches, which are actuated by cams mounted on respective shafts of the stepping mechanism, as is indicated in FIGS. 3*a, b* the pressure range to be swept in unit steps is selected by the provision of respective cams 12, the reversal point is selected by the provision of respective cams 13, and the program termination point, at which the receiver is to be evacuated, is selected by the provision of respective cams 11.

The mode of operation of the controller will be explained with reference to the automatic control system which is diagrammatically represented in FIG. 1. It is desired to maintain a constant pressure in the receiver 17 for a predetermined time and then to change the pressure to a different value in accordance with a predetermined program. To this end, the stepping mechanism is first set by hand to a certain control point, which may be assumed to be higher than the pressure in the receiver. The electronic micro-balance 1 of the measuring controller 7 shows then that the pressure is too low so that the solenoid valve 18 is opened. If the pressure in the receiver is very much lower, the pointer of the measuring controller will move farther to the left so that the larger solenoid valve 19 is opened too. The solenoid valves are supplied with gas which has been withdrawn from the reservoir 20 and adjusted by the pressure-reducing valve 21 to a coarsely adjusted supply pressure, which is higher than any desired pressure in the receiver. The gas will then flow into the receiver until the desired pressure has been reached. If the pressure in the receiver is higher than the desired pressure, the pointer of the measuring controller will be deflected to the right and a control valve 23 connected to the vacuum pump 24 and operated by a servomotor 22 will be opened in proportion to the deviation. The vacuum pump 24 will draw gas until the desired pressure has been reached again. After a predetermined time, which is set at the timer 8, the latter initiates one or more steps of the stepping mechanism so that a higher desired pressure is set. When the desired pressure has been set to a value which is selected in the switch gear of FIGS. 3*a, b* with the aid of the pin cam 12, the subsequent pressure-setting steps are smaller. When the desired pressure has been set to another value, which is selected with the aid of the pin cam 13, the pressure-setting program is reversed so that the pressures are now reduced in steps. The pin cam 11 acts to terminate the program. A stepping mechanism having two cascade-coupled shafts for performing ten steps per revolution may be used to perform a program of one hundred steps in upward and downward directions.

In the apparatus according to the invention, the system for an automatic control of the gas pressure does not interfere with a measurement of pressure or weight and enables in addition to such measurement an automatic or program control of the pressure in a receiver with the aid of final control elements, such as solenoid valves or motor-operated valves, within a very large measuring range from vacuum to about 150 kg./sq. cm. with a higher sensitivity than has been attained with the previously known apparatus.

It will be understood that the apparatus according to the invention comprises a microbalance, a pressure-setting stepping mechanism and a comparator for comparing the uncompensated output of the microbalance with a pressure set at the pressure-setting stepping mechanism. These elements together, which form a microbalance system, need not be structurally combined. Even if a pressure-setting stepping mechanism and comparator are structurally combined with a microbalance, an additional pressure-setting stepping mechanism and comparator which are structurally independent of the microbalance may be used to advantage to increase the sensitivity of the microbalance system if the steps of the independent stepping mechanism are smaller than those of the stepping mechanism structurally combined with the microbalance. The stepping mechanism and comparator which are structurally independent of the microbalance may be structurally combined with the controller.

LITERATURE (1) J. Gielessen in: Ullmanns Encyclopädie der technischen Chemie, vol. 2/1, Munich, Urban und Schwarzenberg, 1961, pp. 851–852;

(2) E. von Angerer, H. Ebert, Technische Kunstgriffe bei physikalischen Untersuchungen, 13th edition, Brunswick, Vieweg, 1964, pp. 230–235;

(3) Th. Gast, Feinwerktechnik, No. 53 (1949), pp. 167–172;

(4) Th. Gast, Vakuum Technik, No. 14 (1965), pp. 41–44.

What is claimed is:

1. An apparatus for the measurement, automatic control and program control of the gas pressure in a gas receiver over a wide range of pressures where the gas receiver is connected to a gas supply, and comprising an electronic vacuum microbalance system, said microbalance system having a lift-producing member responsive to the gas pressure in said gas receiver, a pressure setting stepping mechanism connected to said microbalance system to control the capacity thereof, timer means including a pulse generator connected to said stepping mechanism to initiate step movements thereof, first valve means connected between the gas receiver and said gas supply and second valve means connected between said gas receiver and a vacuum pump for controlling the pressure in the gas receiver, and electrical controller means operatively connected to said first and second valve means and said microbalance system for controlling said valve means in response to the output of the microbalance system.

2. Apparatus as set forth in claim 1 and comprising measuring means in said controller means for indicating the output of said microbalance system.

3. Apparatus as set forth in claim 1 in which said first valve means comprise solenoid valve means.

4. Apparatus as set forth in claim 1 in which said second valve means comprise motor-operated valve means.

5. Apparatus as set forth in claim 1 in which said stepping mechanism is operable to pressure settings in a range from $10^{-2}$ to 760 millimeters mercury, and said lift-producing member consists of a glass bulb having a volumetric capacity of about 80 cubic centimeters.

6. Apparatus as set forth in claim 1 in which said stepping mechanism comprises two cascade-coupled shafts and an automatic program control device is coupled to said shafts.

7. Apparatus as set forth in claim 6, in which said automatic program control device comprises adjustable cams coupled to said shafts.

8. Apparatus as set forth in claim 6, in which said automatic program control device comprises switching discs mechanically coupled to said shafts, and an electric program control circuit electrically connected to said switching discs and comprising selector switches and relays.

9. Apparatus as set forth in claim 6, in which said stepping mechanism includes drive means energizable to cause said stepping mechanism to perform successive steps, and said automatic program control device comprises switchgear operable to deenergize said drive means, a plurality of cams coupled to said shafts and adapted each to operate said switchgear after a selected number of said steps, and a selector switch connected to said switchgear and controlling said selected number.

10. Apparatus as set forth in claim 1 which comprises a relay circuit connected between said pulse generator and said stepping mechanism and adapted to produce a selected number of pulses in response to each pulse transmitted by said pulse generator, and a selector switch connected to said circuit and selecting said number of pulses.

11. Apparatus as set forth in claim 1 and comprising equilibrium-sensing means for producing a signal whenever a variable has assumed a constant value, said pulse generator being coupled to said equilibrium-sensing means and adapted to transmit a pulse in response to said signal.

12. Apparatus as set forth in claim 11, in which said variable is a weight.

References Cited

UNITED STATES PATENTS

| | | | |
|---|---|---|---|
| 2,023,164 | 12/1935 | Cady | 73—30 |
| 2,992,302 | 7/1961 | Schuler | 73—405X |

WILLIAM F. O'DEA, Primary Examiner

D. J. ZOBKIW, Assistant Examiner

U.S. Cl. X.R.

73—405; 137—487.5, 624.11